(No Model.)

P. J. McMAHON.
SEWER CAP.

No. 360,168. Patented Mar. 29, 1887.

Witnesses.
W. Rossiter
Otto Lubkert.

Inventor
Patrick J. McMahon
By Wm. H. Lotz
Atty.

UNITED STATES PATENT OFFICE.

PATRICK JOS. McMAHON, OF CHICAGO, ILLINOIS.

SEWER-CAP.

SPECIFICATION forming part of Letters Patent No. 360,168, dated March 29, 1887.

Application filed September 21, 1886. Serial No. 214,129. (No model.)

*To all whom it may concern:*

Be it known that I, PATRICK JOS. MCMAHON, a citizen of the United States of America, residing at Chicago, in the county of Cook and State of Illinois, have invented certain new and useful Improvements in Sewer-Caps, of which the following is a specification, reference being had therein to the accompanying drawings.

This invention relates to devices for hermetically connecting the waste and soil pipes with the house-drains so as to prevent the escape of sewage-gases; and it consists in providing metal covers that fit the interior of the socket part of house-drain pipes and have openings for inserting the waste and soil pipes, and that are constructed to form annular channels inside the sewer-pipe socket and outside the soil or waste pipe to be calked with a pliable substance—such as tarred oakum—and the same to be covered with a water and air tight composition—such as asbestus cements—that will close all joints hermetically, and will thus permanently prevent the escape of sewage-gases or the overflow of sewage-water through such connection, all as will be fully hereinafter described and specifically claimed.

Figure 1:
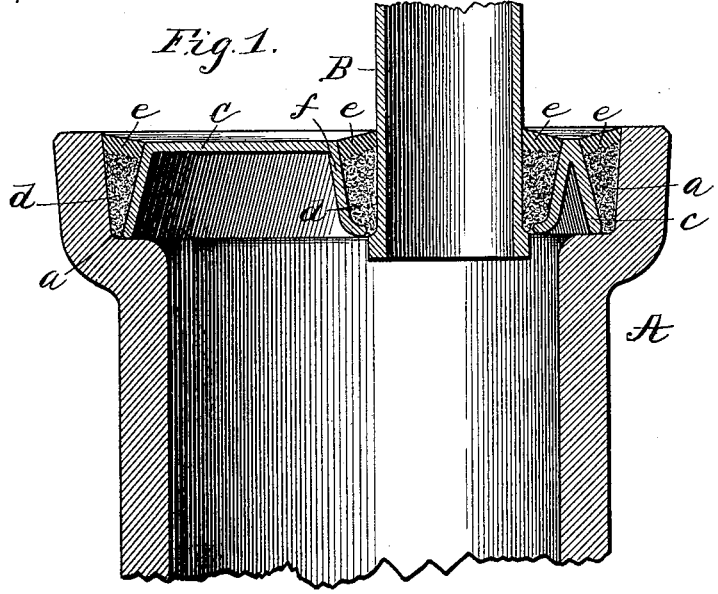
Figure 2:
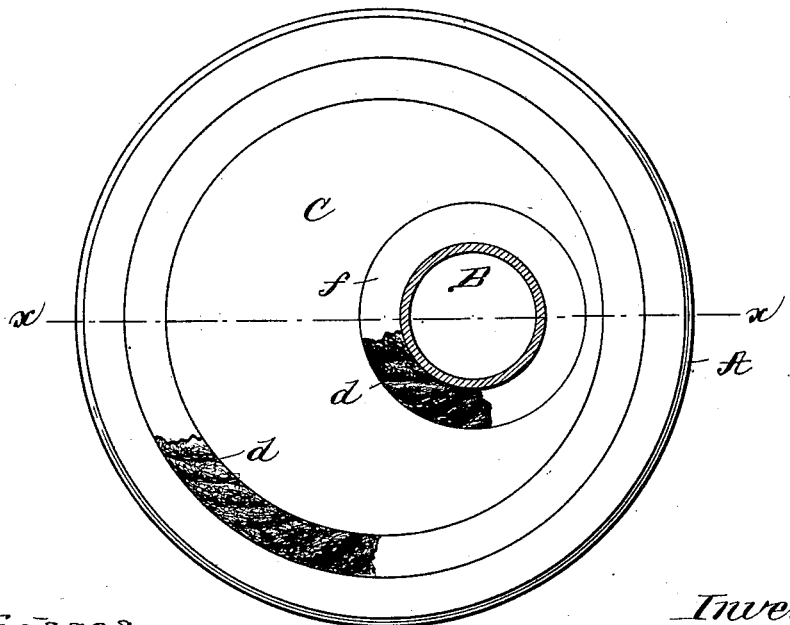

In the accompanying drawings, Figure 1 represents a vertical section through the sewer and soil pipe connection, and Fig. 2 a sectional plan of the same.

Corresponding letters in the several figures of the drawings designate like parts.

A denotes the mouth of the sewer, that for the purpose of leading therein the waste or soil pipe B is placed in an upright position to extend above the surface of the ground.

C is the sewer-cap, which, preferably, I make of cast-iron. This cap C, I make cup or saucer shaped, having a flaring annular flange, $c$, which enters the socket $a$ of the sewer-mouth, resting with its edge upon the bottom annular shoulder of such socket, and leaving an annular space or groove between the cap and sewer-mouth, which is calked with tarred oakum or other flexible or pliable material $d$, and is then covered, preferably, with asbestus cement $e$.

Each cap C is provided with one or more openings, $f$, for connecting the soil or waste pipes B, and each such opening has a downwardly-contracted nozzle with an inwardly-curved edge, through which the end of the pipe is passed. The annular channel between this pipe B and the nozzle $f$ is also calked with tarred oakum or analogous material $d$, and is then covered with asbestus cement or an analogous composition to form an hermetic joint.

I prefer the use of asbestus cement because it will never quite harden, and will therefore accommodate itself to any slight movement of pipe B from expansion and contraction, or from settling of the building, without opening the joints, while at the same time it will permit removal and replacement of the cap for cleaning the house-drains without requiring new material for sealing the joints again.

What I claim is—

The metallic sewer-cap C, having annular flange $c$, in combination with a sewer-pipe having an enlarged socket that forms the shoulder on the inside of the pipe, upon which the cap rests, providing an annular groove around such cap for calking and cementing, substantially as set forth.

In testimony whereof I affix my signature in presence of two witnesses.

PATRICK JOS. McMAHON.

Witnesses:
WM. H. LOTZ,
OTTO LUBKERT.